(12) United States Patent
Bartko et al.

(10) Patent No.: US 7,716,118 B2
(45) Date of Patent: May 11, 2010

(54) SYSTEM AND METHOD FOR PROVIDING LATENCY PROTECTION FOR TRADING ORDERS

(76) Inventors: Peter Bartko, 6 E. Ridge Rd., Warwick, NY (US) 10990; John Robert Capuano, 11 Hedges Ave., Chatham, NJ (US) 07928; Joseph C. Noviello, 18 Colt Rd., Summit, NJ (US) 07901; Brian Alexander Weston, 14 Whitlockville Rd., Katonah, NY (US) 10536

( * ) Notice: Subject to any disclaimer, the term of this patent is extended or adjusted under 35 U.S.C. 154(b) by 392 days.

(21) Appl. No.: 11/623,734

(22) Filed: Jan. 16, 2007

(65) Prior Publication Data

US 2008/0172321 A1  Jul. 17, 2008

(51) Int. Cl.
*G06Q 40/00* (2006.01)
(52) U.S. Cl. ............................. 705/37; 705/35
(58) Field of Classification Search ............... 705/37, 705/35, 36 R, 39, 38
See application file for complete search history.

(56) References Cited

U.S. PATENT DOCUMENTS

| | | | |
|---|---|---|---|
| 5,136,501 A * | 8/1992 | Silverman et al. ............... | 705/37 |
| 5,305,200 A | 4/1994 | Hartheimer et al. | |
| 5,655,088 A | 8/1997 | Midorikawa et al. | |
| 5,727,165 A | 3/1998 | Ordish et al. | |
| 6,421,653 B1 * | 7/2002 | May .......................... | 705/36 R |
| 7,127,422 B1 * | 10/2006 | Bundy ........................ | 705/36 R |
| 7,130,824 B1 | 10/2006 | Amanat et al. | |
| 7,242,669 B2 | 7/2007 | Bundy et al. | |
| 2002/0023048 A1 * | 2/2002 | Buhannic et al. ............... | 705/37 |
| 2002/0198816 A1 | 12/2002 | Gilbert et al. | |
| 2005/0075963 A1 | 4/2005 | Balabon | |
| 2005/0137961 A1 * | 6/2005 | Brann et al. .................... | 705/37 |
| 2005/0228741 A1 | 10/2005 | Leibowitz | |
| 2006/0069638 A1 | 3/2006 | Hotta | |
| 2006/0173764 A1 * | 8/2006 | Costakis et al. ............... | 705/35 |
| 2007/0027796 A1 * | 2/2007 | Claus et al. .................... | 705/37 |
| 2007/0027797 A1 * | 2/2007 | Claus et al. .................... | 705/37 |
| 2008/0172318 A1 * | 7/2008 | Bartko et al. ................... | 705/37 |
| 2008/0172319 A1 * | 7/2008 | Bartko et al. ................... | 705/37 |
| 2008/0313095 A1 * | 12/2008 | Shalen ...................... | 705/36 R |

OTHER PUBLICATIONS

Anonymous "HyperFeed Technologies Reports First Quarter 2005 Results." May 5, 2005 Business Wire , NA.*
Anonymous "HyperFeed Adds Two Members to Senior Staff." Dec. 22, 2005 Business Wire , NA.*
*Notification of Transmittal of the International Search Report and the Written Opinion of the International Searching Authority* for International Application No. PCT/US08/50250; 9 pages. Apr. 23, 2008.

(Continued)

*Primary Examiner*—Kelly Campen

(57) ABSTRACT

A system for managing trading orders comprises a memory operable to store an order associated with a first price. The system further comprises a processor communicatively coupled to the memory and operable to identify a latency value. The processor is further operable to receive a counter-order and to identify a potential trade associated with the order and the counterorder, the potential trade based at least in part on the first price. If the latency value satisfies a configurable condition, the processor is further operable to initiate a configurable period of time. If the potential trade is not valid upon expiration of the configurable period, the processor is further operable to prevent the execution of the potential trade.

66 Claims, 3 Drawing Sheets

OTHER PUBLICATIONS

International Preliminary Report on Patentability for International Application No. PCT/US08/50250, 5 pp., mailed Apr. 23, 2008.

Australian Examiner's Report for Application No. 2008200004; dated Jun. 17, 2009 (2 pages).

* cited by examiner

SYSTEM AND METHOD FOR PROVIDING LATENCY PROTECTION FOR TRADING ORDERS

TECHNICAL FIELD OF THE INVENTION

The present invention relates generally to electronic trading and more specifically to a system and method for providing latency protection for trading orders.

BACKGROUND OF THE INVENTION

In recent years, electronic trading systems have gained widespread acceptance for the trading of a variety of items, such as goods, services, stocks, bonds, currencies, and commodities. In traditional trading systems, traders may submit electronic trading orders to the trading system over networks. The network transmission speed for one trader may be faster than the network transmission speed for another trader. In a fast moving market, the trader associated with the slower network connection may be at a significant disadvantage. In particular, when market conditions change, the trader may want to cancel a previously submitted order. As a result, the trader may transmit to the trading system a request to cancel the order. The slow network connection, however, may cause the trader's request to arrive at the trading system after a counterorder from another trader. In such situations, traditional trading systems match the counterorder to the previously submitted order. The result is a trade that is unwanted by the trader with the slower network connection. The execution of unwanted trades may discourage traders from engaging in trading activity.

SUMMARY OF THE INVENTION

In accordance with the present invention, the disadvantages and problems associated with prior electronic trading systems have been substantially reduced or eliminated.

In some embodiments, a system for managing trading orders comprises a memory operable to store an order associated with a first price. The system further comprises a processor communicatively coupled to the memory and operable to identify a latency value. The processor is further operable to receive a counterorder and to identify a potential trade associated with the order and the counterorder, the potential trade based at least in part on the first price. If the latency value satisfies a configurable condition, the processor is further operable to initiate a configurable period of time. If the potential trade is not valid upon expiration of the configurable period, the processor is further operable to prevent the execution of the potential trade.

The invention has several important technical advantages. Various embodiments of the invention may have none, some, or all of these advantages. One advantage is that the trading system is operable to monitor and compensate for latency in the system. In particular, upon identifying a potential trade involving an order and counterorder, the trading system is operable to record the potential trade in a timer queue associated with a configurable period of time. Upon expiration of the configurable period of time, the trading system is operable to determine whether the potential trade is still valid. If the trading system determines that the potential trade is no longer valid, the trading system may prevent the execution of the potential trade. Thus, the trading system may prevent the execution of unwanted trades. The trading system may thereby encourage traders to participate in trading activity. An increase in trading activity may increase liquidity in the trading system.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
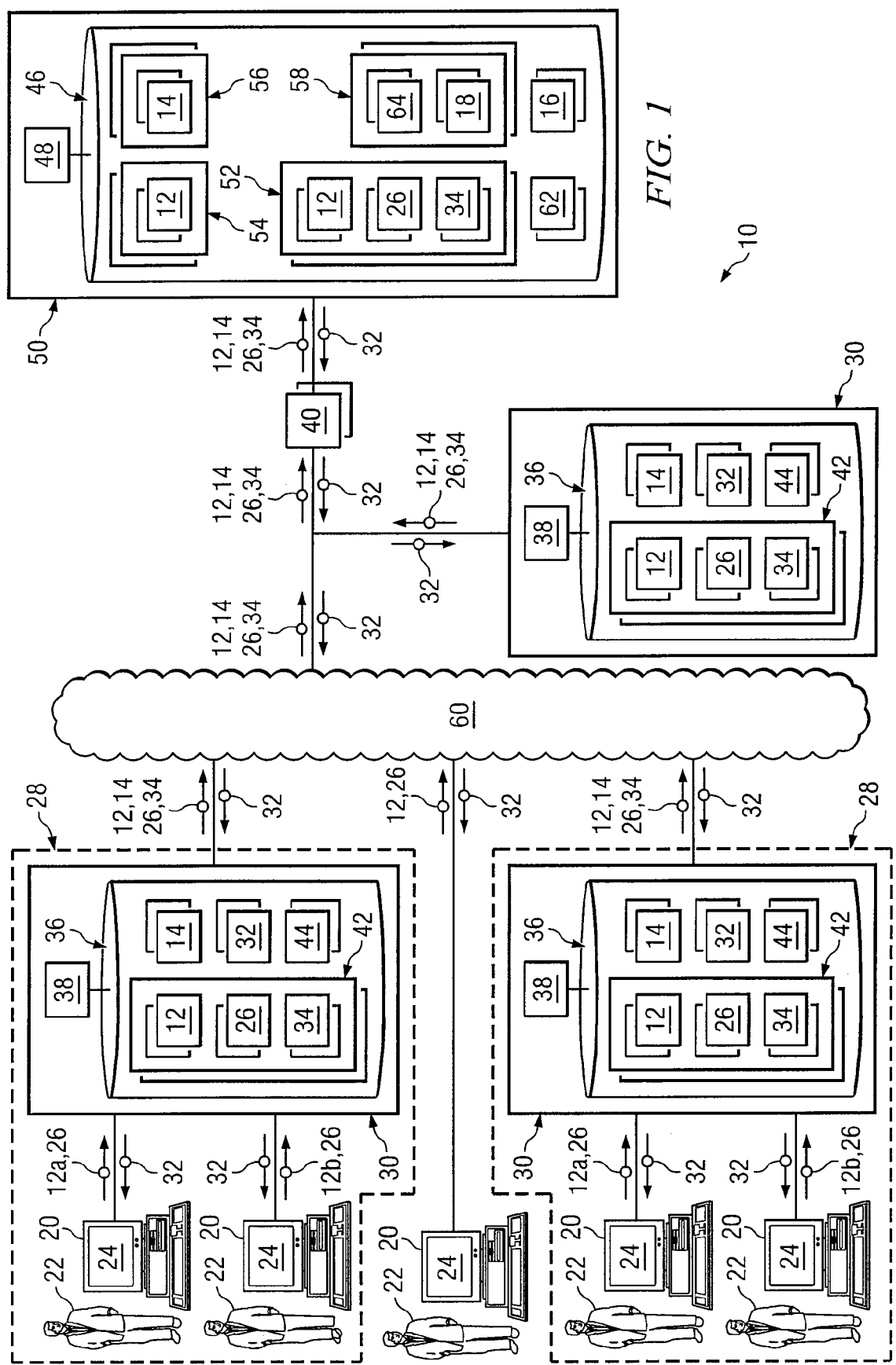
FIG. 1 illustrates one embodiment of a trading system in accordance with the present invention.

FIG. 1 illustrates one embodiment of a trading system 10. Trading system 10 may comprise clients 20, manager servers 30, gateway servers 40, and a trading platform 50 communicatively coupled by one or more networks 60. Generally, trading system 10 is operable to receive, process, and match trading orders 12 from clients 20. Trading system 10 is further operable to monitor latency associated with communications in trading system 10. In particular, trading system 10 may determine latency values 14 associated with one or more components in trading system 10. If a particular latency value 14 satisfies a configurable condition 16, trading system 10 may monitor a potential trade for a configurable period 18 of time prior to executing the potential trade. If, upon expiration of the configurable period 18, trading system 10 determines that the potential trade is not valid, trading system 10 may prevent execution of the potential trade. By monitoring potential trades during configurable period 18, trading system 10 may protect traders 22 against unwanted trades.

Trading system 10 may comprise one or more clients 20. Client 20 represents any suitable local or remote end-user device that may be used by traders 22 to access one or more elements of trading system 10, such as trading platform 50. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of trading system 10. Client 20 may also comprise any suitable user interface such as a display, microphone, keyboard, or any other appropriate terminal equipment according to particular configurations and arrangements. It will be understood that trading system 10 may comprise any number and combination of clients 20. In some embodiments, client 20 may comprise a graphical user interface (GUI) 24.

GUI 24 is generally operable to tailor and filter data presented to trader 22. GUI 24 may provide trader 22 with an efficient and user-friendly presentation of trading orders 12, market data, and/or other suitable information. GUI 24 may comprise a plurality of displays having interactive fields, pull-down lists, and buttons operated by trader 22. In one example, GUI 24 presents relevant market data to trader 22 and conceals the remaining information to reduce visual clutter. Then, upon receiving a request from trader 22, GUI 24 expands the visual representation of market data to display trading history, trading volumes, credit limits, and/or other suitable information. GUI 24 may include multiple levels of abstraction including groupings and boundaries. It should be understood that the term graphical user interface may be used in the singular or in the plural to describe one or more graphical user interfaces 24 and each of the displays of a particular graphical user interface 24.

Clients 20 are operable to receive trading orders 12 and change orders 26 from traders 22. Clients 20 are further operable to send trading orders 12 and change orders 26 to gateway server 40. Trading orders 12 may comprise orders to trade products such as, for example, currencies, financial instruments, stocks, bonds, futures contracts, equity securities, mutual funds, options, derivatives, commodities, or any number and combination of suitable trading products. Trading orders 12 may comprise bids, offers, market orders, limit orders, stop loss orders, day orders, open orders, GTC ("good till cancelled") orders, "good through" orders, "all or none" orders, "any part" orders, or any other suitable order for trading.

A particular trading order 12 may be referred to as an order 12a or a counterorder 12b. Orders 12a and counterorders 12b represent complementary actions such as, for example, buying and selling. If the party that submits a particular order 12a is referred to as trader 22, then the party that submits a corresponding counterorder 12b may be referred to as a "counterparty" trader 22. If a particular order 12a represents a buy order (e.g., bid, take, lift, etc.), then a corresponding counterorder 12b may represent a sell order (e.g., offer, hit, etc.). Conversely, if a particular order 12a represents a sell order, then a corresponding counterorder 12b may represent a buy order.

Change orders 26 may comprise orders to cancel and/or modify a previously submitted trading order 12. In some embodiments, after submitting trading order 12, trader 22 may later decide that he or she no longer wants to execute trading order 12. In this situation, trader 22 may submit a particular change order 26 that instructs trading platform 50 to cancel trading order 12. Upon receiving the particular change order 26, trading platform 50 may delete, deactivate, and/or ignore trading order 12. In other embodiments, after submitting trading order 12 for a particular trading product at a particular price, trader 22 may later decide that he or she wants to execute the trade at a different price and/or with a different quantity. In this situation, trader 22 may submit change order 26 that instructs trading platform 50 to change the price, quantity, and/or other suitable characteristic of trading order 12.

Although clients 20 are described herein as being used by "traders", it should be understood that the term "trader" is meant to broadly apply to any user of trading system 10, whether that user is an agent acting on behalf of a principal, an individual, a legal entity (such as a corporation), or any machine or mechanism that is capable of placing and/or responding to trading orders 12 in trading system 10. Certain traders 22 in trading system 10 may be associated with market makers 28.

Market maker 28 may refer to any individual, firm, or other entity that submits and/or maintains either or both bid and offer trading orders 12 simultaneously for the same instrument. For example, a market maker 28 may be a brokerage or bank that maintains either a firm bid and/or offer price in a given security by standing ready, willing, and able to buy and/or sell that security at publicly quoted prices. A market maker 28 generally displays bid and/or offer prices for specific numbers of specific securities, and if these prices are met, the market maker 28 will immediately buy for and/or sell from its own accounts. According to certain embodiments, a single trading order 12 may be filled by a number of market makers 28 at potentially different prices.

In some embodiments, market makers 28 may include individuals, firms or other entities that are granted particular privileges such that trading orders 12 received from such individuals, firms or other entities are treated as being received from a traditional market maker 28 (such as a brokerage or bank, for example). For example, certain individuals, firms or other entities that may otherwise be treated as individual traders 22 may be granted privileges to be treated as market makers 28 for the purposes of the systems and methods discussed herein. To receive market maker privileges, an individual, firm or other entity may be required to pay a fee, pay a commission, or submit and/or simultaneously maintain both bid and offer trading orders 12 for particular instruments. According to certain embodiments, an individual, firm or other entity may be designated as a market maker 28 for particular instruments but as a non-market maker for other instruments.

In some embodiments, a multi-tiered system of market makers 28 may be employed. Trading platform 50 may grant different privileges to different market makers 28 based on one or more criteria such as, for example, whether the market maker 28 is associated with an electronic feed, whether the market maker 28 is a strong trader 22, or whether the market maker 28 has particular information. Market makers 28 may be categorized into different tiers for different tradable instruments. For instance, a particular market maker 28 may be categorized as a first-level market maker 28 for instrument(s) for which that market maker 28 is a strong trader 22 and as a second-level market maker 28 for other types of instruments.

In some embodiments, clients 20 may be communicatively coupled to manager server 30. The combination of a particular manager server 30 and one or more clients 20 may represent a computer system maintained and operated by a particular market maker 28. Manager server 30 associated with a particular market maker 28 is generally operable to monitor trading orders 12 submitted by traders 22 associated with the particular market maker 28. Manager server 30 may regulate credit extended to other market makers 28 and/or traders 22 in trading system 10.

In some embodiments, manager server 30 is operable to monitor latency in trading system 10. Latency generally refers to delays associated with communications between and/or functions performed by various components in trading system 10. Latency in trading system 10 may be associated with a number of sources. For example, latency may be attributed, at least in part, to clients 20, manager servers 30, network 60, gateway servers 40, trading platform 50, and/or any number and combination of hardware and/or software components in trading system 10.

According to certain embodiments, manager server 30 may determine one or more latency values 14 associated with various components in trading system 10. Latency value 14 may represent delays associated with the transmission and/or processing of trading orders 12 in trading system 10. In some embodiments, latency value 14 may be based at least in part on the amount of time it takes for trading platform 50 to acknowledge receipt of trading order 12 transmitted from manager server 30. Due to changing conditions in network 60 and trading system 10, latency value 14 may fluctuate over time. Different market makers 28 and/or clients 22 may be associated with different latency values 14. At a given time, a particular latency value 14 associated with network communications between a first manager server 30 and trading platform 50 may be different from another latency value 14 associated with network communications between a second manager server 30 and trading platform 50.

According to certain embodiments, manager server 30 is operable to use an acceptance message 32 and/or a test order 34 to determine latency value 14. Acceptance message 32 represents a communication from trading platform 50 acknowledging receipt of trading order 12, change order 26, and/or test order 34. For example, upon determining that a particular trading order 12 has been received from a particular manager server 30, trading platform 50 is operable to generate acceptance message 32. Trading platform 50 may then transmit acceptance message 32 to the particular manager server 30. The particular manager server 30 may calculate latency value 14 based at least in part on the time at which trading order 12 was sent from manager server 30 and/or the time at which manager server 30 received acceptance message 32 from trading platform 50. In some embodiments, trading order 12 may comprise a time value that represents the time at which manager server 30 transmitted trading order 12 to trading platform 50. Manager server 30 is operable to store time value(s) representing the time at which manager server 30 received trading order 12 from client 20, the time at which manager server 30 transmitted trading order 12 to trading platform 50, the time at which manager server 30 received acceptance message 32 from trading platform, and/or the time(s) associated with any number and combination of events.

Test order 34 represents an order for an artificial trading product. In some embodiments, test order 34 is a dummy order or an artificial order. Because test order 34 is associated with an artificial trading product, trading platform 50 does not execute any trades involving test orders 34. A particular test order 34 may be associated with a time value that represents the time at which manager server 30 transmitted test order 34 to trading platform 50. In some embodiments, in response to receiving test order 34, trading platform 50 may generate and transmit acceptance message 32 to manager server 30. Based at least in part on the time at which manager server 30 transmitted test order 34 and on the time at which manager server 30 received acceptance message 32, manager server 30 may determine latency value 14.

In other embodiments, latency value 14 may be based at least in part on the amount of time associated with the one-way transmission of test order 34 and/or other message(s). For example, test order 34 may comprise a particular time value representing the time at which manager server 30 transmitted test order 34 to trading platform 50. Upon receiving test order 34, trading platform 50 may, based at least in part on the particular time value in test order 34 and the time at which trading platform 50 received test order 34, determine latency value 14 associated with the one-way transmission of test order 34 from manager server 30.

In some embodiments, manager server 30 may be configured to occasionally transmit test orders 34 to trading platform 50. For example, manager server 30 may be configured to transmit test orders 34 at configurable intervals. By periodically sending test orders 34, manager server 30 may calculate and monitor latency values 14 on an ongoing basis.

In some embodiments, manager server 30 is operable to transmit latency values 14 to trading platform 50. In response to receiving latency values 14 from manager server 30, trading platform 50 may adjust conditions in network 60 or trading system 10. Based at least in part on latency values 14, trading platform 50 may take measures to compensate for and/or reduce latency in trading system 10.

Manager server 30 may comprise any suitable combination of hardware and/or software implemented in one or more modules to provide the described functions and operations. In some embodiments, manager server 30 may comprise a general-purpose personal computer (PC), a Macintosh, a workstation, a Unix-based computer, a server computer, or any suitable processing device. Manager server 30 may comprise manager memory 36 and manager processor 38.

Manager memory 36 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates manager memory 36 as internal to manager server 30, it should be understood that manager memory 36 may be internal or external to components of trading system 10, depending on particular implementations. Also, manager memory 36 may be separate from or integral to other memory devices to achieve any suitable arrangement of memory devices for use in trading system 10. According to certain embodiments, manager memory 36 may comprise one or more order logs 42, acceptance messages 32, latency values 14, and manager rules 44.

Order log 42 comprises a log of trading orders 12, change orders 26, and/or test orders 34 transmitted from manager server 30 to trading platform 50. In association with each trading order 12, change order 26, and/or test order 34, order log 42 may store the time at which the particular trading order 12, counterorder 12b, or trading order 12 was sent to trading platform 50. In addition, or alternatively, to storing order log 42, manager memory 36 may store one or more acceptance messages 32 received from trading platform 50. Manager memory 36 may further store latency values 14 calculated by manager server 30.

Manager rules 44 comprise software instructions for routing and/or processing trading orders 12 and/or change orders 26 from clients 20. Manager rules 44 further comprise instructions for generating test orders 34, calculating latency values 14, and regulating trading activity associated with market maker 28.

Manager memory 36 may be communicatively coupled to manager processor 38. Manager processor 38 is generally operable to execute manager rules 44 stored in manager memory 36. Manager processor 38 comprises any suitable combination of hardware and software implemented in one or more modules to provide the described function or operation.

In some embodiments, trading platform 50 may be associated with an internal manager server 30. The internal manager server 30 may be operated by the business entity that maintains and/or operates trading platform 50. In some embodiments, the internal manager server 30 may be directly coupled to gateway server 40. Thus, communications between the internal manager server 30 and gateway server 40 may not be routed through network 60. The internal manager server 30 may be configured to generate and transmit test orders 34 to trading platform 50. In response to receiving test orders 34, trading platform 50 may transmit acceptance messages 32 to the internal manager server 30. The internal manager server 30 may calculate latency values 14 and transmit the calculated latency values 14 to trading platform 50. Thus, trading system 10 may monitor the latency associated with the interfaces, components, and/or servers that not associated with network 60 and/or that are internal to the business entity that maintains and/or operates trading platform 50.

Manager servers 30 may be communicatively coupled to gateway servers 40. Gateway servers 40 generally support communication between clients 20, manager servers 30, and trading platform 50. As clients 20 log into trading system 10, gateway servers 40 may perform authentication, load balancing, and/or other suitable functions. A particular gateway server 40 may comprise any suitable combination of hardware and/or software implemented in one or more modules to provide the described functions and operations. In some embodiments, gateway server 40 may comprise a general-purpose personal computer (PC), a Macintosh, a workstation, a Unix-based computer, a server computer, or any suitable processing device.

Gateway server 40 may be communicatively coupled to trading platform 50. Trading platform 50 is generally operable to process, route, and match trading orders 12 from traders 22. Trading platform 50 is operable to process trading orders 12 by filling orders 12a with one or more corresponding counterorders 12b. Trading platform 50 may include any suitable combination of hardware, software, personnel, devices, components, elements, or objects that may be utilized or implemented to achieve the operations and functions of an administrative body or a supervising entity that manages or administers a trading environment. In some embodiments, trading platform 50 may comprise platform memory 46 and platform processor 48.

Platform memory 46 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates platform memory 46 as internal to trading platform 50, it should be understood that platform memory 46 may be internal or external to components of trading system 10, depending on particular implementations. Also, platform memory 46 may be separate from or integral to other memory devices to achieve any suitable arrangement of memory devices for use in trading system 10. According to certain embodiments, platform memory 46 may comprise inbound queue 52, order books 54, latency value log 56, configurable conditions 16, timer queue 58, and platform rules 62.

Inbound queue 52 may represent an intake queue of trading orders 12, change orders 26, and/or test orders 34 received from gateway server 40. Prior to performing the initial processing of a particular trading order 12, change order 26, and/or test order 34, trading platform 50 may store the particular trading order 12, change order 26, and/or test order 34 in inbound queue 52. The trading orders 12, change orders 26, and/or test orders 34 in inbound queue 52 may be stored in chronological sequence and processed according to a first-in first-out ("FIFO") sequence. Once a particular trading order 12, change order 26, and/or test order 34 has passed through inbound queue 52, trading platform 50 may generate acceptance message 32 and assign trading order 12, change order 26, and/or test order 34 to the appropriate order book 54 in platform memory 46. In some embodiments, because trading platform 50 may generate acceptance message 32 after trading order 12, change order 26, and/or test order 34 passes through inbound queue 52, latency value 14 may be based at least in part on inbound queue 52.

Order books 54 represent queues, tables, or lists for storing, sorting, and processing information regarding trading orders 12 received from traders 22. Each order book 54 in memory may be associated with a respective trading product. In some embodiments, a particular order book 54 may be associated with a particular type of trading order 12. For example, platform memory 46 may comprise a first order book 54 associated with a first security and a second order book 54 associated with a second security. In some embodiments, a particular trading product may be associated with a first order book 54 for bids (e.g., "bid book") and a second order book 54 for offers (e.g., "offer book").

Trading platform 50 may monitor trading orders 12 in order books 54 to identify matches between orders 12a and counterorders 12b. In some embodiments, order 12a and counterorder 12b match if they are for the same trading product and for the same price. For example, a bid for Trading Product X at $10.00 per unit matches an offer of Trading Product X at $10.00 per unit. According to certain embodiments, trading platform 50 may match order 12a and counterorder 12b if their prices cross. For example, trading platform 50 may match a bid for Trading Product X at $10.00 per unit with an offer of Trading Product X at $9.00 per unit. In certain embodiments, counterorder 12b may be an aggressive trading order 12 that does not specify a particular trading product. For example, counterorder 12b may be a "hit" for Trading Product X that targets the current best bid price. Accordingly, if the best bid for Trading Product X is associated with a price of $11, trading platform 50 may match the "hit" to the bid and execute the trade at a price of $11. It should be understood that trading platform 50 is operable to match orders 12a and counterorders 12b of any suitable type and for any suitable trading product.

Upon identifying a match between order 12a and counterorder 12b in order book 54, trading platform 50 may generate a potential trade record 64. Potential trade record 64 represents an entry, message, or other suitable indicator that a match has been identified between a particular order 12a and a particular counterorder 12b. Potential trade record 64 may indicate the particular order 12a and counterorder 12b that have been identified as matching. Trading platform 50 may then store the potential trade record 64 in timer queue 58.

Timer queue 58 represents a queue, table, or list for storing and managing potential trade records 64. Timer queue 58 may be associated with a configurable period 18 of time. When a particular trade record is stored in timer queue 58, trading platform 50 may initiate the configurable period 18. When the configurable period 18 expires, trading platform 50 may determine whether the particular order 12a and counterorder 12b associated with the potential trade record 64 still match. If the particular order 12a and counterorder 12b match upon expiration of the configurable period 18, trading platform 50 may execute a trade with the particular order 12a and counterorder 12b. However, if the particular order 12a and counterorder 12b do not match upon expiration of the configurable period 18, trading platform 50 may prevent the trade involving the particular order 12a and counterorder 12b.

In some embodiments, timer queue 58 may be associated with a callback function. When the configurable period 18 expires, platform processor 48 may be notified and prompted to determine whether the particular order 12a and counterorder 12b associated with the potential trade record 64 still match. In some embodiments, timer queue 58 may store multiple potential trade records 64. As each potential trade record 64 is entered in timer queue 58, a respective configurable period 18 may be initiated for that potential trade record 64. Thus, configurable period 18 for a first potential trade record 64 may, in some embodiments, overlap with configurable period 18 for a second potential trade record 64.

During configurable period 18 associated with a particular order 12a and counterorder 12b, the particular order 12a and counterorder 12b may remain listed in order books 54. According to certain embodiments, trading platform 50 may receive, during configurable period 18, change order 26 associated with the particular order 12a or counterorder 12b. In some embodiments, trading platform 50 may cancel the particular order 12a or counterorder 12b based at least in part on received change order 26. In other embodiments, trading platform 50 may change the price, the quantity, and/or other characteristic of order 12a or counterorder 12b based at least in part on the received change order 26. If change order 26 causes the particular order 12a and counterorder 12b to not match, then, upon expiration of configurable period 18, trading platform 50 may prevent the execution of a trade between the particular order 12a and counterorder 12b.

In some embodiments, preventing the execution of the trade between order 12a and counterorder 12b may comprise deleting order 12a and/or counterorder 12b from order book 54, moving order 12a or counterorder 12b to a different order book 54, assigning market priority to a third trading order 12, and/or matching order 12a or counterorder 12b with a third trading order 12.

An example illustrates certain embodiments. Trader A submits to trading platform 50 Bid A for Trading Product X at $10.00 per share. Trading platform 50 stores Bid A in order book 54. Subsequently, Trader B submits to trading platform 50 Offer B for Trading Product X at $10.00 per share. Trading platform 50 stores Offer B in order book 54 and identifies a match between Bid A and Offer B. Trading platform 50 generates potential trade record 64 associated with Bid A and Offer B and stores potential trade record 64 in timer queue 58. Upon storing potential trade record 64 in timer queue 58, trading platform 50 initiates configurable period 18. During configurable period 18, trading platform 50 receives change order 26 from Trader A. Change order 26 directs trading platform 50 to cancel Bid A. Accordingly, trading platform 50 cancels Bid A. In this example, trading platform 50 deletes Bid A from order book 54. Subsequently, configurable period 18 expires. Upon expiration of configurable period 18, platform processor 48 scans for Bid A and Offer B in order book(s) 54 and determines that, because Bid A was canceled, there is no match between Bid A and Offer B. Accordingly, trading platform 50 does not execute trade involving Bid A and Offer B.

In the foregoing example, if trading platform 50 had, upon initially identifying the match, executed a trade involving Bid A and Offer B rather than initiate the configurable period 18, the particular change order 26 from Trader A would not have been received in time to prevent the trade. If Trader A submitted the particular change order 26 prior to Offer B and if the particular change order 26 was delayed due to latency in trading system 10, the latency in trading system 10 would have contributed to the execution of a trade that Trader A did not want. The execution of unwanted trades may discourage Trader A from submitting trading orders 12. Thus, by avoiding the execution of unwanted trades, trading platform 50 may increase the number of trading orders 12 submitted by traders 22, which may increase liquidity in trading system 10.

In the foregoing example, the price of Trading Product X was expressed in dollars. It should be understood, however, that the price of a particular trading product may be expressed according to any currency, rate, or other suitable unit.

As explained above, platform memory 46 may comprise latency value log 56. Latency value log 56 comprises one or more latency values 14 received from manager servers 30 and/or determined by trading platform 50. In some embodiments, latency value log 56 may comprise latency values 14 associated with clients 20, manager servers 30, gateway server 40, trading platform 50, network 60, and/or any number and combination of hardware and/or software in trading system 10. According to certain embodiments, latency value log 56 may comprise historic latency values 14 associated with a particular manager server 30. In other embodiments, latency value log 56 may comprise a plurality of current latency values 14, wherein each current latency value 14 is associated with a respective manager server 30.

Platform memory 46 may further comprise one or more configurable conditions 16. Configurable condition 16 may specify a threshold, limitation, characteristic, and/or criteria associated with latency values 14 in latency value log 56 and/or with configurable period 18 associated with timer queue 58. For example, configurable condition 16 may specify that, if latency value 14 in latency value log 56 satisfies a configurable threshold, then configurable period 18 is set to a particular amount of time. As another example, configurable condition 16 may specify that, if latency value 14 does not satisfy a configurable threshold, then configurable period 18 is set to zero. Thus, configurable period 18 may be based at least in part on latency value(s) 14 in latency value log 56. It should be understood that platform memory 46 may comprise any suitable number and combination of configurable conditions 16.

In some embodiments, upon receiving trading order 12, trading platform 50 may determine the particular trader 22, client 20, and/or manager server 30 that submitted trading order 12. According to certain embodiments, configurable period 18 associated with a particular trading order 12 may based at least in part on the particular trader 22, client 20, and/or manager server 30 that submitted the particular trading order 12. For example, trading order 12 from client 20 and/or manager server 30 associated with a particular latency value 14 may be assigned a different configurable period 18 than trading order 12 from a different client 20 and/or manager server 30 associated with a different latency value 14.

As explained above, platform memory 46 may comprise platform rules 62. Platform rules 62 comprise software instructions for performing the described functions and operations.

Platform memory 46 may be communicatively coupled to platform processor 48. Platform processor 48 is generally operable to execute platform rules 62 stored in platform memory 46. Platform processor 48 comprises any suitable combination of hardware and software implemented in one or more modules to provide the described function or operation.

It should be understood that the internal structure of trading platform 50 and the interfaces, processors, and memory devices associated therewith is malleable and can be readily changed, modified, rearranged, or reconfigured to achieve the intended operations of trading platform 50.

As explained above, clients 20, manager servers 30, gateway servers 40, and trading platform 50 may be communicatively coupled via one or more networks 60. Network 60 may represent any number and combination of wireline and/or wireless networks suitable for data transmission. Network 60 may, for example, communicate internet protocol packets, frame relay frames, asynchronous transfer mode cells, and/or other suitable information between network addresses. Network 60 may include one or more intranets, local area networks, metropolitan area networks, wide area networks, cellular networks, all or a portion of the Internet, and/or any other communication system or systems at one or more locations.

It should be understood that the internal structure of trading system 10 and the servers, processors, and memory devices associated therewith is malleable and can be readily changed, modified, rearranged, or reconfigured to achieve the intended operations of trading system 10. In particular, although FIG. 1 illustrates gateway server 40 as separate from trading platform 50, it should be understood that, in some embodiments, trading platform 50 may be operable to perform the functions and operations of gateway server 40.

In operation, trading system 10 is operable to use and manage latency values 14 in processing trading orders 12. According to certain embodiments, manager server 30 may generate and transmit test order 34 to trading platform 50. Trading platform 50 may store test order 34 in inbound queue 52 in memory. Upon retrieving test order 34 from inbound queue 52, trading platform 50 may generate and transmit acceptance message 32 to manager server 30. In some embodiments, based at least in part on the time at which manager server 30 transmitted test order 34 and on the time at which manager server 30 received acceptance message 32, manager server 30 may determine latency value 14. Manager server 30 may then transmit latency value 14 to trading platform 50.

In other embodiments, latency value 14 may be associated with the one-way transmission of test order 34 and/or other message(s). For example, test order 34 may comprise a particular time value representing the time at which manager server 30 transmitted test order 34 to trading platform 50. Upon receiving test order 34, trading platform 50 may, based at least in part on the particular time value in test order 34 and the time at which trading platform 50 received test order 34, determine latency value 14 associated with the one-way transmission of test order 34 from manager server 30.

According to certain embodiments, trading platform 50 may receive trading orders 12 from clients 20. Trading platform 50 may store trading orders 12 in order books 54 in platform memory 46. Upon identifying a match between a particular order 12*a* and counterorder 12*b* in order book 54, trading platform 50 may generate in time queue potential trade record 64 associated with the particular order 12*a* and counterorder 12*b*. Upon generating potential trade record 64, trading platform 50 may initiate configurable period 18. Configurable period 18 may be based at least in part on one or more latency values 14 received and/or determined by trading platform 50. During configurable period 18 associated with a particular order 12*a* and counterorder 12*b*, the particular order 12*a* and counterorder 12*b* may remain stored in order books 54.

During configurable period 18, trading platform 50 may receive change order 26 associated with the particular order 12*a* or counterorder 12*b*. In some embodiments, trading platform 50 may cancel the particular order 12*a* or counterorder 12*b* based at least in part on the received change order 26. In other embodiments, trading platform 50 may change the price, the quantity, and/or other characteristic of order 12*a* or counterorder 12*b* based at least in part on received change order 26. If change order 26 causes the particular order 12*a* and counterorder 12*b* to not match, then trading platform 50 may, upon expiration of configurable period 18, prevent the execution of a trade between the particular order 12*a* and counterorder 12*b*. Preventing the execution of the trade between the particular order 12*a* and counterorder 12*b* may comprise deleting the particular order 12*a* or counterorder 12*b* from order book 54, moving the order 12*a* or counterorder 12*b* to a different order book 54, assigning market priority to a third trading order 12, and/or matching the particular order 12*a* or counterorder 12*b* with a third trading order 12.

Figure 2:
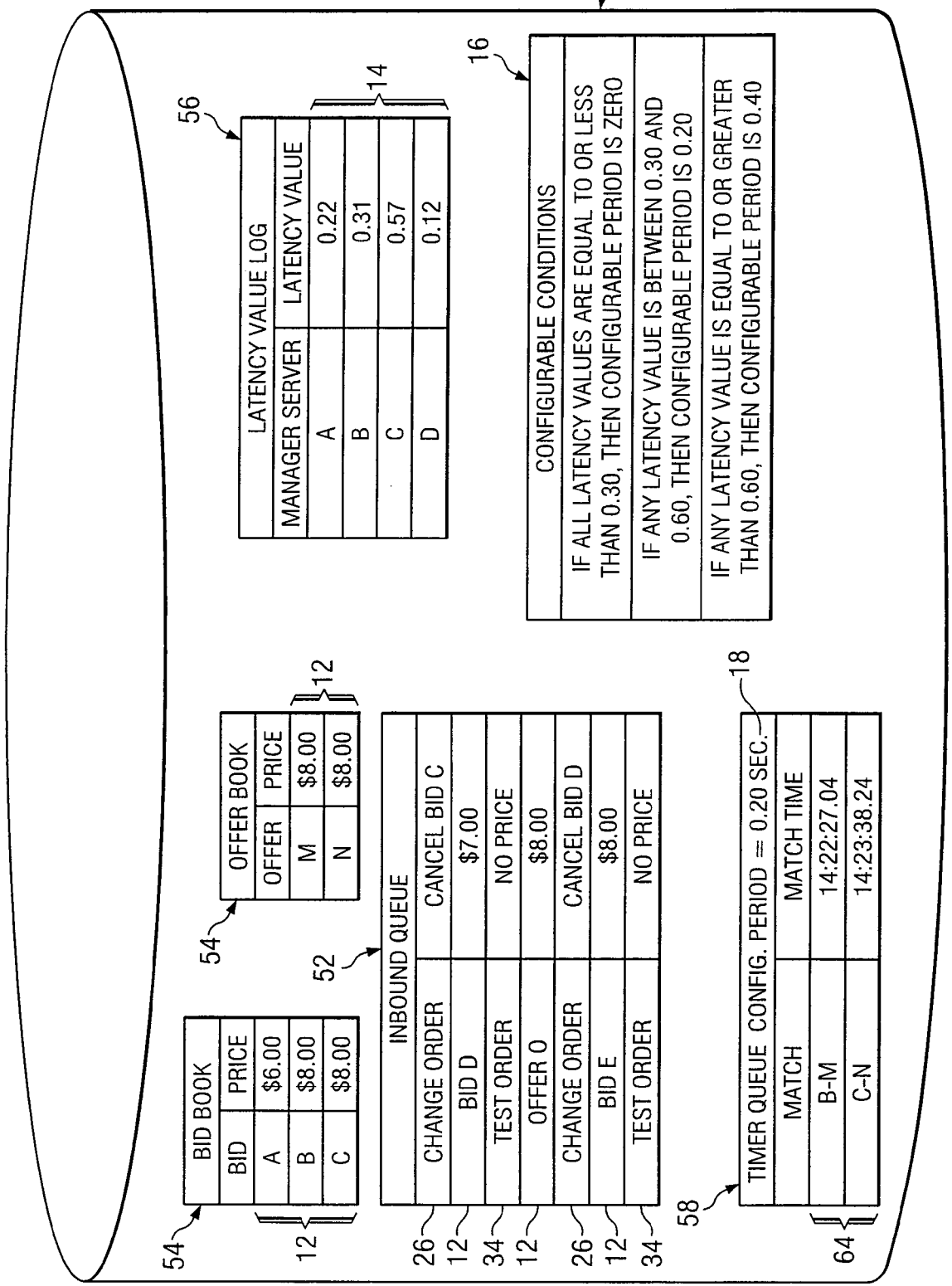
FIG. 2 illustrates a memory comprising order books, a latency value log, configurable conditions, an inbound queue, and a timer queue, according to certain embodiments.

FIG. 2 illustrates an example platform memory 46, which comprises order books 54, latency value log 56, configurable conditions 16, inbound queue 52, and timer queue 58, according to certain embodiments. In this example, latency value log 56 comprises latency values 14 associated with a plurality of manager servers 30. Each latency value 14 was received from a respective manager server 30. Manager server 30 is operable to determine latency value 14 based at least in part on test order 34 and acceptance message 32. In particular, manager server 30 transmits test order 34 to trading platform 50. Upon receiving test order 34, trading platform 50 may generate and transmit acceptance message 32 to manager server 30. Based at least in part on the time at which manager server 30 transmitted test order 34 and on the time at which manager server 30 received acceptance message 32, manager server 30 may determine latency value 14. Manager server 30 may then transmit latency value 14 to trading platform 50.

In this example, latency value log 56 in platform memory 46 comprises latency values 14 from a plurality of manager servers 30. In particular, Manager Server A is associated with latency value 14 of 0.22 seconds, Manager Server B is associated with latency value 14 of 0.31 seconds, Manager Server C is associated with latency value 14 of 0.57 seconds, and Manager Server D is associated with latency value 14 of 0.12 seconds.

The example platform memory 46 further comprises multiple configurable conditions 16. The first configurable condition 16 is that, if all latency values 14 in latency value log 56 are equal to or less than 0.30 seconds, then configurable period 18 is zero. The second configurable condition 16 is that, if any latency value 14 in latency value log 56 is between 0.30 seconds and 0.60 seconds, then configurable period 18 is 0.20 seconds. The third configurable condition 16 is that, if any latency value 14 in latency value log 56 is equal to or more than 0.60 seconds, then configurable period 18 is 0.40 seconds.

Although this example illustrates particular latency ranges and particular configurable periods 18 of time, it should be understood that latency ranges and/or other values associated with configurable condition 16 and/or configurable period 18 may be below, within, or above the illustrated values and/or ranges.

In this example, platform memory 46 further comprises two order books 54—bid book 54 and offer book 54. Initially, bid book 54 comprises Bid A associated with a price of $6.00 and Bid B associated with a price of $8.00. Initially, offer book 54 comprises Offer M associated with a price of $8.00.

Platform processor 48 monitors bid book 54 and offer book 54 to identify any matches between orders 12*a* and counterorders 12*b*. In this example, at 14:22:27.04, platform processor 48 determines that Offer M matches Bid B. Platform processor 48 then generates and stores in timer queue 58 potential trade record 64 associated with Offer M and Bid B. Because latency value log 56 comprises latency values 14 between 0.30 seconds and 0.60 seconds, configurable period 18 associated with timer queue 58 is 0.20 seconds. In this example, during configurable period 18, platform processor 48 does not retrieve from timer queue 58 any change orders 26 associated with Offer M and Bid B. When configurable period 18 expires at 14:22:27.24, trading platform 50 scans order books 54 and determines that Offer M and Bid B still match. Accordingly, trading platform 50 executes a trade with Offer M and Bid B.

Platform processor 48 subsequently retrieves from inbound queue 52 Bid C associated with a price of $8.00. Platform processor 48 stores Bid C in bid book 54. Platform processor 48 then retrieves from inbound queue 52 Offer N associated with a price of $8.00. After storing Offer N in offer book 54, platform processor 48 determines, at 14:23:38.24, that Offer N matches Bid C. Platform processor 48 then generates and stores in timer queue 58 potential trade record 64 associated with Offer N and Bid C. During configurable period 18 associated with potential trade record 64 for Offer N and Bid C (e.g., prior to 14:23:38.44), platform processor 48 retrieves from inbound queue 52 change order 26 that instructs platform processor 48 to cancel Bid C. As a result, platform processor 48 deletes Bid C from bid book 54. In this example, when configurable period 18 expires at 14:23:38.44, platform processor 48 scans order books 54 and determines that the previously identified match between Bid C and Offer N is no longer valid because Bid C has been canceled. Accordingly, trading platform 50 does not execute a trade with Bid C and Offer N.

The example inbound queue 52 comprises multiple trading orders 12, change orders 26, and test orders 34 waiting to be processed by platform processor 48. In this example, test orders 34 in inbound queue 52 are not associated with prices. Test order 34 represents a dummy order and/or an artificial order. Because test order 34 is associated with an artificial trading product, trading platform 50 does not execute any trades involving test orders 34.

In the foregoing example, the price of trading orders 12 was expressed in dollars. It should be understood, however, that the price of a particular trading product may be expressed according to any currency, rate, or other suitable unit.

In the foregoing example, latency values 14 are expressed in seconds. It should be understood, however, that latency values 14 may be expressed according to any suitable unit and/or combination of units.

In the foregoing example, manager server 30 determines latency values 14. It should be understood that, in some embodiments, manager server 30 and/or trading platform 50 may determine latency values 14 that are associated with one-way and/or round-trip communications.

The foregoing example illustrates configurable periods 18 of 0.20 seconds and 0.40 seconds. It should be understood that configurable period 18 may be any suitable amount of time.

The invention has several important technical advantages. Various embodiments of the invention may have none, some, or all of these advantages. One advantage is that trading platform 50 is operable to monitor and compensate for latency in trading system 10. In particular, upon identifying a potential trade involving order 12a and counterorder 12b, trading platform 50 is operable to enter potential trade record 64 in timer queue 58 associated with configurable period 18. Upon expiration of configurable period 18, trading platform 50 is operable to determine whether the potential trade is still valid. If trading platform 50 determines that the potential trade is no longer valid, trading platform 50 may prevent the execution of the potential trade. Thus, trading system 10 may prevent the execution of unwanted trades. Trading system 10 may thereby encourage traders 22 to participate in trading activity. An increase in trading activity may increase liquidity in trading system 10.

Figure 3:
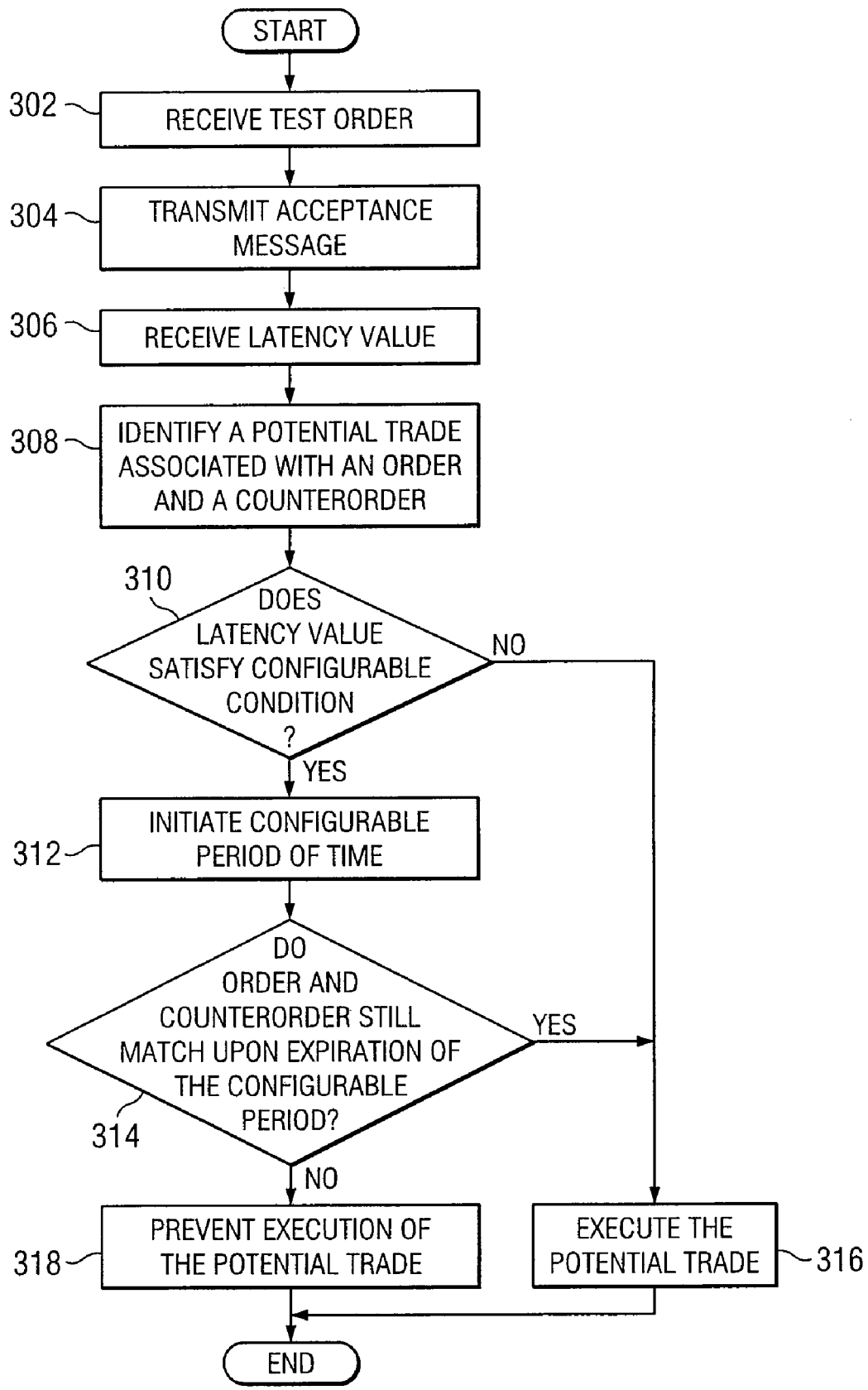
FIG. 3 illustrates a flowchart for providing latency protection for trading orders, according to certain embodiments.

FIG. 3 illustrates a flowchart for providing latency protection for trading orders 12, according to certain embodiments. The method begins at step 302 when trading platform 50 receives test order 34 from manager server 30. Trading platform 50 may initially store test order 34 in inbound queue 52. Upon retrieving test order 34 from inbound queue 52, platform processor 48 may generate acceptance message 32. At step 304, platform processor 48 transmits acceptance message 32 to manager server 30. Upon receiving acceptance message 32, manager server 30 determines latency value 14. Latency value 14 may be based at least in part on the particular time at which test order 34 was sent to trading platform 50 and the particular time at which manager server 30 received acceptance message 32. At step 306, platform processor 48 receives latency value 14 from manager server 30.

At step 308, platform processor 48 identifies a potential trade associated with order 12a and counterorder 12b stored in order books 54 in platform memory 46. At step 310, platform processor 48 determines whether the received latency value 14 satisfies configurable condition 16. In some embodiments, configurable condition 16 may be associated with a latency value threshold. If platform processor 48 determines at step 310 that latency value 14 does not satisfy configurable condition 16, then the method may proceed to step 316. At step 316, platform processor 48 executes the trade with order 12a and counterorder 12b.

If, however, platform processor 48 determines at step 310 that latency value 14 satisfies configurable condition 16, then at step 312 platform processor 48 initiates configurable period 18. Upon expiration of the configurable period 18, platform processor 48 determines at step 314 whether order 12a still matches counterorder 12b. If platform processor 48 determines at step 314 that order 12a still matches counterorder 12b, then at step 316 platform processor 48 executes the trade with order 12a and counterorder 12b. If, however, platform processor 48 determines at step 314 that order 12a does not match counterorder 12b, then at step 318 platform processor 48 prevents the execution of the potential trade. In some embodiments, preventing the execution of the trade between order 12a and counterorder 12b may comprise deleting order 12a and/or counterorder 12b from order book 54, moving order 12a or counterorder 12b to a different order book 54, assigning market priority to a third trading order 12, and/or matching order 12a or counterorder 12b with a third trading order 12. The method then ends.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus, comprising:

a processor;

memory communicatively coupled to the processor and storing instructions that, when executed by the processor, cause the processor to:

identify a latency value;

receive, from a first trader, a first trading order for a trading product, wherein the first trading order comprises a quantity of the trading product and a price;

receive, from a second trader, a second trading order for the trading product;

identify a match between the first trading order and the second trading order based at least in part on the price;

generate a potential trade record based on the match between the first trading order and the second trading order;

store the potential trade record;

initiate a configurable period of time;

receive, during the configurable period of time, at least one change order from the first trader;

act on the first trading order based at least in part on the at least one change order;

upon expiration of the configurable period of time, determine that the potential trade record is no longer valid by determining that the first trading order no longer matches the second trading order; and responsively to determining that the potential trade record is no longer valid, not execute a trade involving the first trading order and the second trading order.

2. The apparatus of claim 1, wherein the instructions, when executed by the processor, further cause the processor to:
  store the latency value in a latency value log in the memory.

3. The apparatus of claim 2, wherein a plurality of latency values are stored in the latency value log and the plurality of latency values comprise the latency value; and
  wherein each latency value of the plurality of latency values is associated with a respective server of a plurality of servers in communication with the processor.

4. The apparatus of claim 3, wherein the plurality of latency values comprise historic latency values.

5. The apparatus of claim 3, wherein the plurality of latency values comprise current latency values.

6. The apparatus of claim 1, wherein identifying the latency value comprises:
  accessing the latency value from the memory.

7. The apparatus of claim 1, wherein the instructions, when executed by the processor, further cause the processor to:
  determine the configurable period of time.

8. The apparatus of claim 7, wherein determining the configurable period of time comprises:
  setting the configurable period of time to a particular amount of time.

9. The apparatus of claim 7, wherein determining the configurable period of time comprises:
  determining the configurable period of time based at least in part on the latency value.

10. The apparatus of claim 7, wherein determining the configurable period of time comprises:
  determining the configurable period of time based at least in part on one or more latency values in a latency value log in the memory.

11. The apparatus of claim 1, wherein the instructions, when executed by the processor, further cause the processor to:
  determine whether the latency value satisfies at least one configurable condition.

12. The apparatus of claim 11, wherein determining whether the latency value satisfies the at least one configurable condition comprises:
  determining whether the latency value satisfies a configurable threshold.

13. The apparatus of claim 11, wherein determining whether the latency value satisfies the at least one configurable condition comprises:
  determining that the latency value satisfies the at least one configurable condition; and
  wherein initiating the configurable period of time comprises:
    initiating the configurable period of time upon determining that the latency value satisfies the at least one configurable condition.

14. The apparatus of claim 11, wherein determining whether the latency value satisfies the at least one configurable condition comprises:
  determining that the latency value satisfies the at least one configurable condition; and
  wherein the instructions, when executed by the processor, further cause the processor to:
    determine the configurable period of time.

15. The apparatus of claim 14, wherein determining the configurable period of time comprises:
  setting the configurable period of time to a particular amount of time.

16. The apparatus of claim 14, wherein determining the configurable period of time comprises:
  determining the configurable period of time based at least in part on the latency value.

17. The apparatus of claim 14, wherein determining the configurable period of time comprises:
  determining the configurable period of time based at least in part on one or more latency values in a latency value log in the memory.

18. The apparatus of claim 17, wherein setting the configurable period of time to the particular amount of time comprises:
  determining that the latency value satisfies the at least one configurable condition; and
  setting the configurable period of time to a particular amount of time.

19. The apparatus of claim 1, wherein receiving the second trading order comprises:
  receiving the second trading order for the trading product, wherein the second trading order comprises a second quantity of the trading product and a second price; and
  wherein identifying the match between the first trading order and the second trading order comprises:
    identifying the match between the first trading order and the second trading order based at least in part on the price and the second price; and
  wherein the instructions, when executed by the processor, further cause the processor to:
    receive a third trading order for the trading product, wherein the third trading order comprises a third quantity of the trading product and a third price;
    identify a second latency value;
    receive a fourth trading order for the trading product;
    identify a potential trade between the third trading order and the fourth trading order based at least in part on the third price;
    determine that the second latency value does not satisfy at least one configurable condition; and
    execute a trade between the third trading order and the fourth trading order.

20. The apparatus of claim 19, wherein the instructions, when executed by the processor, further cause the processor to:
  upon determining that the second latency value does not satisfy the at least one configurable condition, and prior to executing the trade between the third trading order and the fourth trading order, setting a second configurable period to zero.

21. The apparatus of claim 1, wherein receiving the first trading order comprises:
  receiving, from the first trader via a server in communication with the processor, the first trading order, wherein the first trader submitted the first trading order at a client; and
  wherein the instructions, when executed by the processor, further cause the processor to:
    determine at least one of the first trader, the client, and the server.

22. The apparatus of claim 21, wherein the instructions, when executed by the processor, further cause the processor to:
  determine the configurable period of time based at least in part on at least one of the first trader, the client, and the server.

23. The apparatus of claim 21, wherein the instructions, when executed by the processor, further cause the processor to:
  receive, from a third trader via another server in communication with the processor, a third trading order for the trading product, wherein the third trader submitted the first trading order at another client;

identify a second latency value;
determine at least one of the third trader, the another client, and the another server;
determine a second configurable period of time based at least in part on at least one of the first trader, the client, and the server;
identify a potential trade between the third trading order and another trading order;
initiate the second configurable period of time.

24. The apparatus of claim 1, wherein the instructions, when executed by the processor, further cause the processor to:
prior to initiating the configurable period of time, determining the configurable period of time based at least in part on a plurality of latency values stored in the memory, wherein the plurality of latency values comprise the latency value.

25. The apparatus of claim 24, wherein determining the configurable period of time comprises:
applying a plurality of configurable conditions to the plurality of latency values stored in the database;
setting the configurable period of time to a particular time value.

26. The apparatus of claim 24, wherein determining the configurable period of time comprises:
determining whether all latency values of the plurality of latency values stored in the memory are less than or equal to a first value.

27. The apparatus of claim 26, wherein determining the configurable period of time further comprises:
determining that all latency values of the plurality of latency values are less than or equal to the first value; and
setting the configurable period of time to a first time value.

28. The apparatus of claim 27, wherein determining the configurable period of time further comprises:
determining that all latency values of the plurality of latency values are not less than or equal to the first value; and
setting the configurable period of time to a second time value.

29. The apparatus of claim 27, wherein determining the configurable period of time further comprises:
determining that all latency values of the plurality of latency values are not less than or equal to the first value; and
determining whether any latency value of the plurality of latency values is greater than the first value and less than a second value.

30. The apparatus of claim 29, wherein determining the configurable period of time further comprises:
determining that at least one latency value of the plurality of latency values is greater than the first value and less than the second value; and
setting the configurable period of time to a second time value.

31. The apparatus of claim 29, wherein determining the configurable period of time further comprises:
determining that at least one latency value of the plurality of latency values is not greater than the first value and less than the second value.

32. The apparatus of claim 31, wherein determining the configurable period of time further comprises:
setting the configurable period of time to a third time value.

33. The apparatus of claim 31, wherein determining the configurable period of time further comprises:
prior to setting the configurable period of time to a third time value, determining that at least one latency value of the plurality of latency values is greater than or equal to the second value.

34. The apparatus of claim 1, wherein acting on the first trading order causes the first trading order to no longer match the second trading order.

35. The apparatus of claim 1, wherein acting on the first trading order comprises:
canceling the first trading order based at least in part on the at least one change order.

36. The apparatus of claim 35, wherein canceling the first trading order comprises:
deleting the first trading order at least in part on the at least one change order.

37. The apparatus of claim 1, wherein acting on the first trading order comprises:
changing a characteristic of the first trading order based at least in part on the at least one change order.

38. The apparatus of claim 37, wherein changing the characteristic of the first trading order comprises:
changing the price of the first trading order based at least in part on the at least on change order.

39. The apparatus of claim 37, wherein changing the characteristic of the first trading order comprises:
changing the quantity of the first trading order based at least in part on the at least on change order.

40. The apparatus of claim 37, wherein not executing the trade comprises: deleting the first trading order.

41. The apparatus of claim 37, wherein not executing the trade comprises:
preventing an execution of the trade.

42. The apparatus of claim 1, wherein the instructions, when executed by the processor, further cause the processor to:
store the first trading order in a first order book in the memory; and
store the second trading order in a second order book in the memory.

43. The apparatus of claim 42, wherein determining that the first trading order no longer matches the second trading order comprises:
scanning the first order book and the second order book.

44. The apparatus of claim 42, wherein acting on the first trading order comprises:
deleting the first trading order from the first order book based at least in part on the at least one change order.

45. The apparatus of claim 44, wherein determining that the first trading order no longer matches the second trading order comprises:
scanning at least the first order book; and
determining that the first trading order has been deleted from the first order book.

46. The apparatus of claim 42, wherein not executing the trade comprises:
deleting the first trading order from the first order book.

47. The apparatus of claim 42, wherein not executing the trade comprises:
moving the first trading order from the first order book to another order book.

48. The apparatus of claim 1, wherein not executing the trade comprises:
preventing an execution of the trade.

49. The apparatus of claim 1, wherein not executing the trade comprises:
  deleting the first trading order.
50. The apparatus of claim 1, wherein not executing the trade comprises:
  assigning priority to an order other than the first trading order such that the trade is not executed.
51. The apparatus of claim 1, wherein not executing the trade comprises:
  matching the first trading order to another trading order.
52. The apparatus of claim 1, wherein not executing the trade comprises:
  matching the second trading order to another trading order.
53. The apparatus of claim 1, wherein identifying the latency value comprises:
  receiving the latency value.
54. The apparatus of claim 53, wherein the instructions, when executed by the processor, further cause the processor to:
  receive a test order; and
  send an acceptance message in response to the test order.
55. The apparatus of claim 54, wherein receiving the latency value comprises:
  receiving the latency value from a server.
56. The apparatus of claim 55, further comprising:
  the server, wherein the server is communicatively coupled to the processor, the server comprising:
    a second processor;
    a second memory communicatively coupled to the second processor and storing second instructions that, when executed by the second processor, cause the second processor to:
    submit the test order at a first time;
    receive, at a second time, the acceptance message;
    determine the latency value based at least in part on the first time and the second time; and
    transmit the latency value.
57. The apparatus of claim 56, wherein the instructions, when executed by the processor, further cause the processor to:
  prevent execution of the test order in response to receiving the test order, wherein the test order is associated with an artificial trading product.
58. The apparatus of claim 57, wherein preventing execution of the test order comprises:
  prevent execution of any trades involving the test order in response to receiving the test order because the test order is associated with the artificial trading product, wherein the test order is not associated with a price.
59. The apparatus of claim 1, wherein identifying the latency value comprises:
  determining the latency value.
60. The apparatus of claim 59, wherein the instructions, when executed by the processor, further cause the processor to:
  receive a test order at a first time, wherein the test order comprises a second time at which the test order was transmitted from a server; and
  wherein determining the latency value comprises:
    determining the latency value based at least in part on the first time and the second time.
61. The apparatus of claim 1, wherein receiving the second trading order comprises:
  receiving the second trading order for the trading product, wherein the second trading order comprises a second quantity of the trading product and a second price; and
  wherein identifying the match between the first trading order and the second trading order comprises:
    identifying the match between the first trading order and the second trading order based at least in part on the price and the second price.
62. The apparatus of claim 61, wherein the price matches the second price; and
  wherein identifying the match between the first trading order and the second trading order further comprises:
    identify the match between the first trading order and the second trading order based at least in part on the price matching the second price.
63. The apparatus of claim 61, wherein the instructions, when executed by the processor, further cause the processor to:
  receive a third trading order for the trading product, wherein the third trading order comprises a third quantity of the trading product and a third price;
  receive a fourth trading order for the trading product;
  identify a match between the third trading order and the fourth trading order based at least in part on the third price;
  generate a second potential trade record based on the match between the third trading order and the fourth trading order;
  store the second potential trade record in the timer queue;
  initiate a second configurable period of time; and
  if no change order associated with the third trading order and the fourth trading order is received during the second configurable period of time,
    upon expiration of the second configurable period of time, determine that the second potential trade record is valid by determining that the third trading order still matches the fourth trading order; and
    responsively to determining that the potential trade record is valid, execute a trade involving the third trading order and the fourth trading order.
64. The apparatus of claim 1, wherein storing the potential trade record comprises:
  storing the potential trade record in a timer queue in the memory.
65. The apparatus of claim 64, wherein the timer queue is associated with a callback function, the callback function being configured to notify and prompt the processor to, upon an expiration of the configurable period of time, determine whether the potential trade record is still valid.
66. A method, comprising:
  identifying, by a processor of a computer, a latency value;
  receiving, from a first trader, by the processor, a first trading order for a trading product, wherein the first trading order comprises a quantity of the trading product and a price;
  receiving, from a second trader, by the processor, a second trading order for the trading product;
  identifying, by the processor, a match between the first trading order and the second trading order based at least in part on the price;
  generating, by the processor, a potential trade record based on the match between the first trading order and the second trading order;
  storing, by the processor, the potential trade record in the memory;
  initiating, by the processor, a configurable period of time;
  receiving, by the processor, during the configurable period of time, at least one change order from the first trader;

acting, by the processor, on the first trading order based at least in part on the at least one change order;

upon expiration of the configurable period of time, determining, by the processor, that the potential trade record is no longer valid by determining that the first trading order no longer matches the second trading order; and responsively to determining that the potential trade record is no longer valid, not executing, by the processor, a trade involving the first trading order and the second trading order.

* * * * *